G. Matthewman,
Glass Press.
Nº 50,373. Patented Oct. 10, 1865.

Witnesses:
Wm H Bishop
Andrew DeLacy

Inventor:
George Matthewman,
By his attorney
J. N. McIntire

UNITED STATES PATENT OFFICE.

GEORGE MATTHEWMAN, OF WILLIAMSBURG, NEW YORK.

IMPROVED TOOL FOR MANUFACTURE OF GLASS.

Specification forming part of Letters Patent No. 50,373, dated October 10, 1865.

*To all whom it may concern:*

Be it known that I, GEO. MATTHEWMAN, of Williamsburg, of Kings county, in the State of New York, have invented certain new and useful Improvements in Apparatus for Holding Shanks of Molded Buttons; and I do hereby declare that the following is a full and exact description thereof, reference being had to the accompanying drawings, making part of this application.

My invention relates to a novel method of holding the shanks of molded or compressed buttons and forming the buttons around them; and has for its object a simple and effective tool for securely holding the shanks in a proper position rigidly while the button is being formed, and one which may be readily applied in connection with an ordinary press, and may be operated by a variety of means.

Previous to my invention the best tool or apparatus properly known for this purpose is one in which the button-shanks are placed between the adjacent edges of two plates hinged together along such edges, and having cut in said edges cavities, which match together and form receptacles for the accommodation of the shanks. This kind of shank-holding tool or apparatus is subject to various objections, such as its incapacity to hold the shank up rigidly from its (eye) end, and the difficulty of using it rapidly and successfully or in connection with a simple mechanism.

My invention consists in the employment, in combination, of two holder-plates arranged to part and come together at a given line, with suitable cavities formed in their adjacent edges, and a sliding bar constructed and arranged so as to admit of the insertion of the shanks and then be closed or slid over them to hold them in, all as hereinafter fully set forth.

To enable those skilled in the art to make and use my invention, I will proceed to describe the construction and operation of my improved apparatus, referring by letters to the accompanying drawings, in which—

Figure 1:
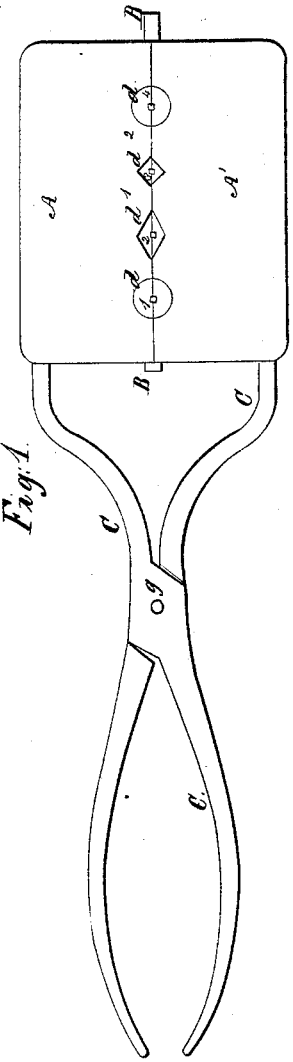
Figure 3:
Figure 4:
Figure 2:
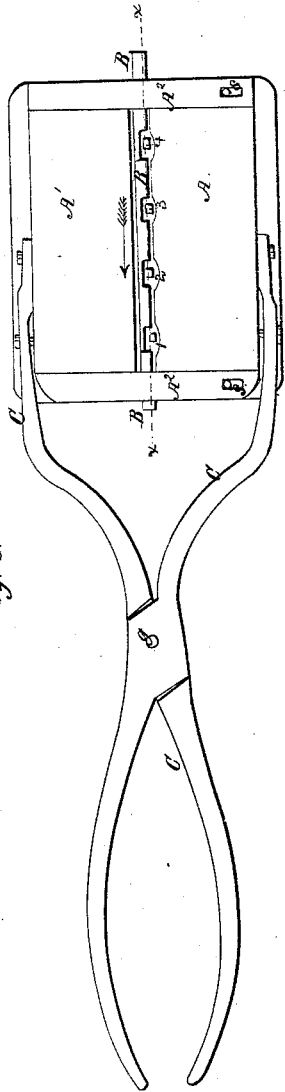

Figure 1 is a plan view of one of my improved tools or apparatuses. Fig. 2 is a plan of the opposite side to that seen at Fig. 1. Fig. 3 is a longitudinal section at the line $x\ x$, Fig. 2; and Fig. 4 is a detail view of one of the button-shanks, such as used in connection with my improved apparatus.

A and A' are two metallic plates, similar in size and shape, one of which, however, A', has two bars, $A^2\ A^2$, permanently secured to its opposite ends, between which bars the other plate, A, is arranged to slide to a limited extent, being guided and retained by pins projecting from it through slots $s\ s$ in the bars $A^2$. Each one of the plates A and A' is pivoted or hinged near the center of its outer edge to one end of one of a pair of handles, C, which latter are pivoted together at $g$ after the fashion of a pair of shears or tongs. By means of these handles C the plates A and A' are moved together and apart and held in either position desired. The adjacent edges of plates A A' are grooved out for a short distance on one and the same side to accommodate a sliding bar, B, (see Figs. 2 and 3,) which has a series of notches, 5 6 7 8, cut in one edge, that come over the joint between the two plates A A', and these plates have cut in their edges cavities corresponding somewhat in size and shape to the notches in bar B, where they come near said bar, and tapering down toward the opposite face of the plates to holes 1 2 3 4 just large enough to allow the passage or projection through them of the shanks of the eyes, as seen at Fig. 3.

$h$ represents the button eye or shank, which may be made in the usual manner.

The operation of my improved apparatus may be thus briefly described: The parts being adjusted as shown at Fig. 2, four shanks (such as shown at Fig. 4) are dropped down into the cavities or hoppers 1 2 3 4. The bar B is then pushed in the direction indicated by the red arrow until the notches 5 6 7 8 come opposite to the solid portions of the edges of the plates A A'—that is to say, so as to make the bar B cover over the hoppers 1 2 3 4, and thus box in and retain the shanks or eyes. The tool is next placed in the press, and the die containing the material from which the button is to be formed is brought in contact with the other die-faces $d\ d'\ d^2$, and the stock molded around the protruding shanks $h$ in the usual manner, after which the plates are thrown slightly apart by operating the handles C and the finished buttons released from the tool.

I have only shown the tool, which is sufficient to illustrate my invention, as it would be used in connection with a press and face-dies in the manner well known to those familiar with the manufacture of glass or composition buttons.

The motions of the slide-bar B may be governed by stops on the press, and, if deemed expedient, an organized machine embracing my invention in such manner as to have the plates A A' operated by automatic mechanism may be adopted.

It is obvious that the number and peculiar shape of the die-surfaces $d$ $d'$ $d^2$ and hopper-cavities may be varied at the will of the constructing mechanic; and it will be understood that I do not propose to limit myself to any precise detail of construction so long as the mode of operation and characteristic features of my invention are embodied in the tool or organized machine.

Having fully described the construction and operation of my invention, what I claim as new, and desire to secure by Letters Patent, is—

The movable plates A A', having cavities in their adjacent edges to match and form shank-holding receptacles, in combination with a retaining-bar, B, or its equivalent, the whole arranged to operate substantially as described, for the purpose set forth.

In testimony whereof I have hereunto set my hand and seal.

GEORGE MATTHEWMAN. [L. S.]

In presence of—
J. N. McINTIRE,
CHAS. SPEER.